United States Patent [19]

Formia et al.

[11] 4,304,199
[45] Dec. 8, 1981

[54] CYLINDER HEAD FOR COMPRESSION-IGNITION INTERNAL COMBUSTION ENGINES HAVING PRECOMBUSTION CHAMBERS

[75] Inventors: Antonio Formia, Turin; Giorgio Filtri, Moncalieri, both of Italy

[73] Assignee: Fiat Veicoli Industriali S.p.A., Turin, Italy

[21] Appl. No.: 108,939

[22] Filed: Dec. 31, 1979

[51] Int. Cl.³ .............................. F02F 1/00; F02F 1/36
[52] U.S. Cl. ............................. 123/254; 123/41.82 R; 123/193 H
[58] Field of Search ............. 123/41.72, 41.82, 193 R, 123/193 H, 254

[56] References Cited

U.S. PATENT DOCUMENTS

| | | | |
|---|---|---|---|
| 1,736,287 | 11/1929 | Knudsen | 123/41.82 R |
| 2,013,627 | 9/1935 | Fahlman | 123/41.82 R |
| 2,739,579 | 3/1956 | Ware et al. | 123/41.82 A |
| 3,044,454 | 7/1962 | Sutton | 123/254 |
| 3,087,473 | 4/1963 | Thompson et al. | 123/193 R |
| 3,420,215 | 1/1969 | Seifert | 123/41.82 R |
| 4,121,550 | 10/1978 | Wand et al. | 123/41.82 R |

Primary Examiner—Craig R. Feinberg
Attorney, Agent, or Firm—Sughrue, Mion, Zinn, Macpeak and Seas

[57] ABSTRACT

An aluminum cylinder head for a compression-ignition internal combustion engine is formed with a cooling chamber and a number of cavities which provide for each cylinder of the engine a precombustion chamber in communication at its upper end with a seat for a fuel injector. Each precombustion chamber and its associated fuel-injector seat are delimited by a wall the outer surface of which faces into the cooling chamber. The cooling chamber is separated by a dividing wall into a lower part adjacent the precombustion chambers and an upper part adjacent the fuel injector seats. Openings are provided in the dividing wall juxtaposed the precombustion chambers so that coolant flowing through said openings between the lower and upper parts of the cooling chamber is constrained to flow against the walls of the precombustion chambers.

1 Claim, 4 Drawing Figures

CYLINDER HEAD FOR COMPRESSION-IGNITION INTERNAL COMBUSTION ENGINES HAVING PRECOMBUSTION CHAMBERS

The present invention relates to cylinder heads for compression-ignition internal combustion engines of the type having precombustion chambers associated with the cylinders of the engine. Cylinder heads of this type are constituted by a block formed to define a cooling chamber through which coolant can flow and a number of cavitites which provide for each cylinder of the engine, a precombustion chamber, induction and discharge ducts, and a seat for a fuel injector. Each of the cavities forming a fuel-injector seat is positioned above the associated precombustion chamber and communicates with the upper part of this chamber. Each precombustion chamber and its associated fuel-injector seat are delimited by a wall the outer surface of which faces into the cooling chamber.

Cylinder heads of the above specified type are generally made of aluminium and are used in particular for induction type precombustion diesel engines intended for use in motor vehicles. The use of aluminium for the cylinder head makes it possible to obtain the lightness in weight which is indispensable in this type of application.

However, although an aluminium cylinder head is advantageous from the point of view of lightness, the use of aluminium makes the cylinder head more susceptible to undesirable thermal effects experienced at high operating temperatures. Such undesirable effects include stresses of thermal origin which are particularly significant in fast-running diesel engines with precombustion chambers, this being the type of engine which is normally used for diesel-powered motor vehicles. These stresses can give rise to problems from the point of view of engine reliability, especially where the engine is of the supercharged type. In fact, for such engines the values of the maximum combustion pressure values and of the thermal loads which occur during engine operation can be as much as 30-50 percent greater than the corresponding values which occur in a similar engine of the induction type.

To alleviate problems relating to thermal effects in a cylinder head, it is an object of the present invention to provide a cylinder head with improved cooling characteristics.

This object is achieved in accordance with the present invention by the provision of a cylinder head of the type initially specified, in which a dividing wall is disposed within the cooling chamber of the cylinder head and serves to divide this chamber into a first part associated with the precombustion chambers, and a second part associated with the fuel injector seats, the said dividing wall being provided adjacent each precombustion chamber with an opening inter-communicating the first and second parts of the cooling chamber.

The provision of the cooling-chamber dividing wall and its associated openings forces coolant to flow over the walls of the precombustion chambers thereby enabling a more effective cooling of the precombustion chambers which is where the highest temperatures are found in the cylinder head during engine operation. Furthermore, the cooling of the base wall of the cooling chamber is also improved this being the cylinder head wall which faces into the engine cylinders when the head is assembled on the engine block. The improved cooling of the cylinder head is advantageous from the point of view of engine reliability and the mechanical strength of the cylinder head during normal operation of the engine. With such improved cooling characteristics, an aluminium cylinder head can be used for a supercharged precombustion diesel engine without giving rise to undue difficulties as regards engine reliability.

The stiffening effect of the dividing wall on the overall rigidity of the cylinder head enables the thickness of the base wall of the cooling chamber to be reduced. Such a reduction in base wall thickness facilitates cooling of the base wall, which is particularly advantageous where the cylinder head is of aluminium and the cylinder block is of cast iron since differences in thermal expansion between the base wall of the cylinder head and the opposed surface of the cylinder block may give rise to serious sealing difficulties in the zone of joining between the cylinder head and the engine block.

An aluminium cylinder head embodying the invention will now be particularly described, by way of example, with reference to the accompanying diagrammatic drawings, in which.

Figure 1:
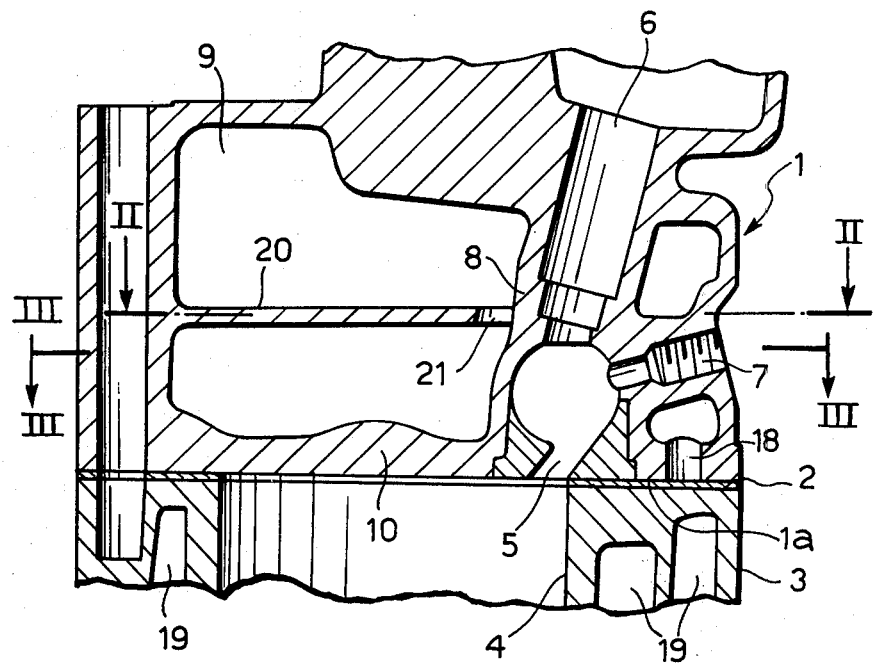
FIG. 1 is a transverse section of the cylinder head mounted on an engine cylinder block only part of which is shown, the section being taken in the plane containing the axis of a cylinder of the engine.
Figure 2:
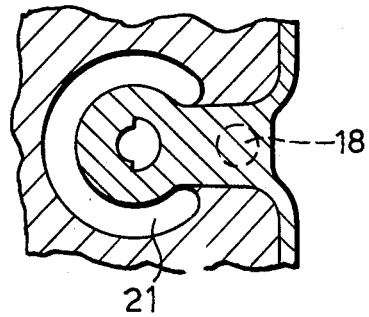
FIG. 2 is a section on line II—II of FIG. 1.
Figure 3:
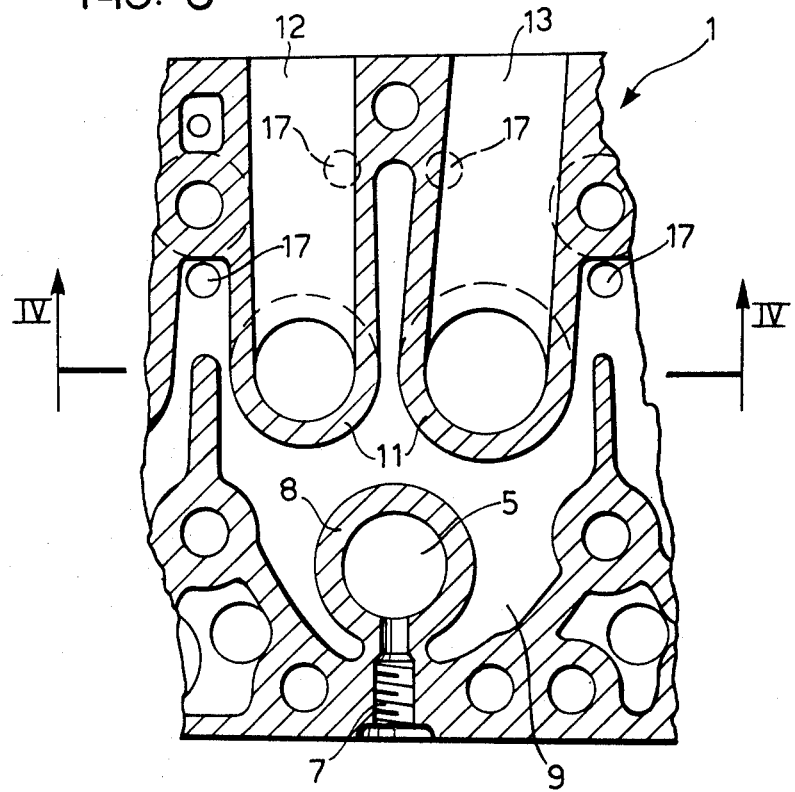
FIG. 3 is a section on line III—III of FIG. 1.

The aluminium cylinder head 1 now to be described is for mounting on the cylinder block 3 of a supercharged precombustion diesel engine with the interposition of a gasket 2. The cylinder block is formed with cylinders 4.

The cylinder head is constituted by a block of aluminium which is formed in correspondence with each of the engine cylinders 4, with a cavity 5 which communicates with that cylinder 4 to form a precombustion chamber therefor. In the present case, this chamber 5 is of vortex type.

Each precombustion chamber 5 communicates at its upper end with a cylindrical cavity 6 formed as a seat to receive a fuel injector associated with the precombustion chamber 5. Opening into one side of each chamber 5 is a threaded hole 7 which is arranged to receive a glow plug for the preheating of fuel in the precombustion chamber 5.

Figure 4:
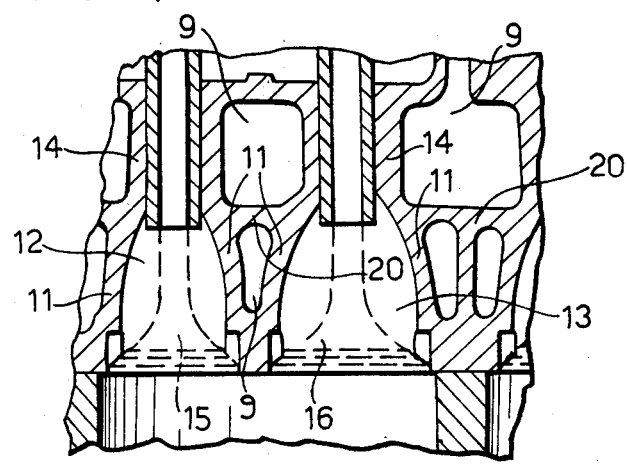
FIG. 4 is a section on line IV—IV of FIG. 1.

Each precombustion chamber 5 and its associated cavity 6, are delimited by a wall 8 the external surface of which is cylindrical in form and faces into a cooling chamber 9 of cylinder head 1. This chamber 9, through which engine coolant is arranged to flow, is delimited along its bottom by a base wall, 10. The sides of the chamber 9 are in part delimited by the walls 8, and by walls 11 which define induction and discharge ducts 12 and 13 in the cylinder head. The ducts 12 and 13 communicate with corresponding ones of the cylinders 4. As can be seen in FIG. 4, above the openings of the induction and discharge ducts 12 and 13 in the bottom of the cylinder head 1, walls 14 define guide passages for the valve stems of induction and discharge valves 15 and 16 (shown in broken lines in FIG. 4). These valves 15 and 16 cooperate with seats defined in the bottom of the cylinder head around the induction and ducts 12 and 13.

The base wall 10 is provided with a number of inlets 17 through which coolant is fed into the chamber 9, each of these inlets 17 being located away from the precombustion chambers 5. In addition, adjacent each precombustion chamber 5, the base wall 10 is provided with a further coolant inlet 18 (see FIG. 1).

The coolant inlets 17 and 18 communicate with cooling jackets 19 provided in the engine block.

A dividing wall 20 is disposed inside the cooling chamber 9 and extends perpendicularly to the axes of engine cylinders 4. The wall 20 serves to divide the cooling chamber 9 into a lower part associated with the precombustion chambers 5, and an upper part associated with the cavities 6 forming seats for the fuel injectors. Adjacent each of the precombustion chambers 5 the dividing wall 20 is provided with an opening 21 which intercommunicates upper and lower parts of the chamber 9. Each opening 21 is formed by an arcuate slot which extends around the annular wall 8 of the adjacent precombustion chamber 5 in a plane substantially tangential to the top of that chamber 5.

In this way, coolant flowing from the inlets 17 and 18 into the upper part of the cooling chamber 9, is constrained to pass in the proximity of those portions of the cylindrical walls 8 which delimit the precombustion chambers 5. This gives rise to a considerable improvement in the cooling of the precombustion chambers 5. Each of the inlets 18 is located adjacent an area of the corresponding precombustion chamber 5 which is diametrally opposite the central area of the arcuate arc slot 21 associated with that chamber 5. In this manner coolant entering the cooling chamber 9 through an inlet 18 and flowing up through the corresponding opening 21 is constrained to flow over the whole of the portion of the cylindrical wall 8 which defines the adjacent precombustion chamber 5. This gives rise to a further improvement in the cooling of the precombustion chamber 5.

The presence of the dividing wall 20 increases the moment of inertia of the cross section of cylinder head 1. This allows the thickness of the base wall 10 to be reduced, with resultant advantages in the ease of cooling of this wall. Improved cooling of the base wall 10 reduces the differences in thermal expansion between the wall 10, which is of aluminium, and the upper part of the cylinder block 3, which is of cast iron.

The greater efficiency in the cooling of the cylinder head 1 due to the use of dividing wall 20 allows the cylinder head 1 to be used for a precombustion diesel engine of the supercharged type without adversely effecting engine reliability.

It will be appreciated that although the example illustrated refers to a cylinder head of aluminium, (since the advantages resulting from the provision of the dividing wall 20 and its associated openings 21 are most significant for such heads), it is possible to provide cylinder heads made of other material such as cast iron, with the apertured dividing wall 20 for improving cooling of the head.

We claim:

1. A cylinder head for a compression-ignition internal combustion engine, of the type provided with precombustion chambers associated with the cylinders of the engine, the cylinder head being constituted by a block formed to define walls delimiting both a cooling chamber through which coolant can be passed and a number of cavities providing for each of the cylinders of said engine a precombustion chamber, induction and discharge ducts, and a seating for a fuel injector, each said precombustion chamber and the associated said fuel-injector seat being in communication with each other and being delimited by a said wall the outer surface of which faces into the said cooling chamber, a further one of said walls serving to divide the cooling chamber into a first part associated with the precombustion chambers, and a second part associated with the fuel injector seats, the said dividing wall being formed to define adjacent each precombustion chamber a sole opening inter-communicating the first and second parts of the cooling chamber, said wall delimiting each precombustion chamber being substantially cylindrical in external form, said opening defined by the dividing wall adjacent each precombustion chamber being of arcuate form extending about the said cylindrical wall delimiting the precombustion chamber, and said block being formed to define a single cooling-chamber inlet adjacent each precombustion chamber, each said inlet being located in a position relative to the corresponding precombustion chamber which is substantially diametrically opposed the central area of the said arcuate opening surrounding said chamber which forms a constraining means wherein coolant fed into the cooling chamber through said inlet is constrained to flow over substantially the whole of the external surface of the said cylindrical wall which delimits the precombustion chamber, in order to reach the said arcuate opening.

* * * * *